United States Patent
Zhang et al.

(10) Patent No.: US 9,019,892 B2
(45) Date of Patent: Apr. 28, 2015

(54) ACCESS SYSTEM AND METHOD FOR TRANSMITTING ETHERNET SIGNAL AND MOBILE COMMUNICATION SIGNAL

(75) Inventors: Jincai Zhang, Wuhan (CN); Hanbing Li, Wuhan (CN); Zigang Wu, Wuhan (CN); Zuwang Zhou, Wuhan (CN); Xiangzhi Meng, Wuhan (CN)

(73) Assignee: Wuhan Hongxin Telecommunication Technologies Co., Ltd, Wuhan (CN)

( * ) Notice: Subject to any disclaimer, the term of this patent is extended or adjusted under 35 U.S.C. 154(b) by 205 days.

(21) Appl. No.: 13/502,550

(22) PCT Filed: Jun. 16, 2011

(86) PCT No.: PCT/CN2011/075791
§ 371 (c)(1),
(2), (4) Date: Apr. 18, 2012

(87) PCT Pub. No.: WO2012/037821
PCT Pub. Date: Mar. 29, 2012

(65) Prior Publication Data
US 2012/0201544 A1    Aug. 9, 2012

(30) Foreign Application Priority Data
Sep. 23, 2010 (CN) .......................... 2010 1 0289110

(51) Int. Cl.
*H04W 4/00* (2009.01)
*H04B 10/2575* (2013.01)

(52) U.S. Cl.
CPC .............. *H04B 10/25754* (2013.01)

(58) Field of Classification Search
USPC ................... 370/328, 419; 398/115
See application file for complete search history.

(56) References Cited

U.S. PATENT DOCUMENTS

| | | | | |
|---|---|---|---|---|
| 2006/0215680 | A1* | 9/2006 | Camagna | 370/419 |
| 2008/0298311 | A1* | 12/2008 | Zha et al. | 370/328 |

FOREIGN PATENT DOCUMENTS

| | | | |
|---|---|---|---|
| CN | 1549497 A | * | 11/2004 |
| CN | 101931468 A | | 12/2010 |
| CN | 201821503 U | * | 5/2011 |
| EP | 1 720 293 A1 | | 11/2006 |
| WO | 2012/037821 A1 | | 3/2012 |

* cited by examiner

*Primary Examiner* — Andrew Chriss
*Assistant Examiner* — Atique Ahmed
(74) *Attorney, Agent, or Firm* — Maschoff Brennan (57) ABSTRACT

An access system and method for transmitting Ethernet signals and mobile communication signals. The system includes a near-end host unit and remote-end user units. Through the near-end host unit, the Ethernet signals and mobile communication signals can be combined. The near-end and remote-end host units are connected through four pairs of twisted pairs. The combined Ethernet and mobile communication signals are sent to a user terminal for providing broadband access service and wireless access service. Premises network resources can be used without re-laying category 5 cables, so the investment is less and it is quick and convenient to provide service. Furthermore there needs to be added only one host unit beside the optical network unit equipment, and replace the user terminal simultaneously. Power is not needed to be taken at the user's home. The placement position of the terminal is flexible without being limited by the power-taking positions.

4 Claims, 5 Drawing Sheets

ACCESS SYSTEM AND METHOD FOR TRANSMITTING ETHERNET SIGNAL AND MOBILE COMMUNICATION SIGNAL

TECHNICAL FIELD OF THE INVENTION

The invention relates to an access system for transmitting Ethernet signals and mobile communication signals, and in particular to an access system and an access method for transmitting the two signals by the twisted pairs.

BACKGROUND OF THE INVENTION

After the 3G license in China is issued, there are three operators in the domestic telecom market, and competition for users among the operators is fierce. In order to improve the loyalty of the user, retain old users and attract new users, one of the key elements is to provide high-quality network coverage.

The data statistics show that more than 70 percent of the data service is conducted indoors. With the substantial growth of the 3G users, the proportion of the data service income is increasing. In order to better absorb the indoor service volume, the indoor signal coverage quality must be improved; deep indoor coverage should be performed for the indoor area having data service demand, and deep coverage should be performed for the indoor environment where the very-important-person (VIP) client is located.

The conventional indoor data service is covered mainly through laying the twisted pair cables. The twisted pair is a common communication cable, which resists a part of the external electromagnetic interference in a way of twisting a pair of mutually insulated metal wires. Two insulated copper wires are twisted together based on a certain density, so the degree of signal interference can be reduced, and the electric waves radiated by each wire during transmission can be offset by the electric waves emitted by the other wire, and the name of 'twisted pair' is derived therefrom. The twisted pair is generally formed by two insulated copper wires No. 22-26 winding with one another, and in the actual use, the twisted pair is formed by wrapping multiple pairs of twisted pairs in an insulated cable sleeve. There are four pairs of twisted pairs in the conventional category 5 cables and category 5 enhanced cables, which are known as twisted pair cables. In the twisted pair cables, different wire pairs have different twisted lengths, which range from 38.1 cm to 14 cm in general, and the wires are twisted in anti-clockwise direction. The twisted length of the adjacent wire pairs is above 12.7 cm, and in general, the more dense the twisted wires, the stronger the anti-interference capability. Compared with other transmission media, the transmission distance, the channel width, the data transmission rate and the like of the twisted pair are subject to certain restrictions; however the price thereof is cheaper. The category 5 cable is one of the twisted pair cables, the winding density of the cable is increased, and high-quality insulating material with a transmission rate of 100 MHz is coated outside for voice transmission and data transmission with a maximum transmission rate of 10 Mbps, which is mainly applied to 100BASE-T and 10BASE-T networks. The Ethernet cable is the most commonly used category 5 cable. The category 5 enhanced cable is also one of the twisted pair cables, which has the characteristics of small attenuation, less crosstalk, higher attenuation and crosstalk ratio (ACR) and structural return loss, smaller time delay error and greatly improved performance. The category 5 enhanced cable is mainly applied to Gigabit Ethernet (1000 Mbps).

With the continuous improvement of the environmental awareness and health awareness of the citizens, it is very difficult to permit the access of mobile communication signal to residential areas, to set up the outdoor antennas, and to coordinate the property management. Since the 3G standard has high frequency, and is seriously blocked by walls, and the penetration loss is large, it is difficult to achieve the good indoor coverage effect depending on the macro station signal or corridor signal leakage. It is very inconvenient to arrange wires for each household. The coverage of the indoor home users often has many coordination problems, and the family indoor coverage mainly depends on macro station signal or corridor signal penetration.

At present, most of the three operators provide broadband access service for users in a fiber-to-the-x (FTTx)+local area network (LAN) mode. The optical network unit (ONU) is installed adjacent to the user corridor or weak well side, and the broadband access service is provided for users through the category 5 cable connected to the ONU. The fast Ethernet generally uses the category 5 cable, which only uses the two pairs 1-2, 3-6 of twisted pairs when transmitting the Ethernet data, with two pairs 4-5, 7-8 of twisted pairs being in idle state. Since almost all the residential households are covered with the category 5 cables, the two idle pairs of twisted pairs can be fully utilized to transmit the mobile communication signals, and the Ethernet signals and the mobile communication signals are multiplexed into the same category 5 cable to transmit to the user side. At the same time of providing the high-speed broadband for the families, the mobile communication signals can also be provided. In a period of time in the future, the Ethernet of 100 Mbps can meet the users' demands, so the two idle pairs of twisted pairs are used to transmit the mobile communication signals, and the family coverage problem of the mobile communication signals is solved, which is a fast and cost-saving solution. The family coverage can be realized in this way whether it is 2G mobile communication signals, or 3G mobile communication signals. A solution for solving the indoor mobile communication signal coverage is provided for the three operators.

SUMMARY OF THE INVENTION

The technical problem to be solved by the invention is to provide a low-cost user side deep coverage solution. Through the existing home category 5 cable of the user, the mobile communication signals, such as global system for mobile communication (GSM), code division multiple access (CDMA), time division synchronous code division multiple access (TD-SCDMA), wideband code division multiple access (WCDMA) and the like are transmitted to user's home by making the mobile communication signals share the category 5 cable with the home Ethernet signals, thereby realizing family/indoor coverage. In this way, the cables are not needed to be re-laid, and the difficult home coordination work is not needed. The user only needs to exchange a terminal to realize the broadband access and mobile communication access.

For this purpose, the invention provides an access system for transmitting Ethernet signals and mobile communication signals, comprising a near-end host unit and N remote-end user units; the near-end host unit is connected with an optical network unit for receiving and uploading the Ethernet signals; the near-end host unit is further connected with a base station for receiving and uploading the mobile communication signals; the near-end host unit is connected with the remote-end user units through category 5 cables or category 5 enhanced cables for transmitting the Ethernet signals and the mobile communication signals;

wherein, the near-end host unit comprises a host frequency conversion unit, a host central control unit, a downlink signal allocation unit, an uplink signal allocation unit, N uplink differential-to-single ended units, N downlink single ended-to-differential units, and N network transformer units;

after the downlink mobile communication signals from the base station enter the near-end host unit, the host frequency conversion unit performs down frequency conversion on the downlink mobile communication signals and sends to the downlink signal allocation unit; meanwhile the host frequency conversion unit outputs the internal clock reference signals thereof to the downlink signal allocation unit; the downlink signal allocation unit combines the frequency-converted downlink mobile communication signals and the clock reference signals via a combiner, and further allocates the signals to allocate the downlink into N paths of signals; the N downlink single ended-to-differential units perform the conversion from the singled ended signal to the differential signal on the N paths of signals, so as to match with the impedance of the category 5 cables or category 5 enhanced cables; after the signals are converted to the differential signals, the central control unit sends a pair of control signals respectively into uplink and downlink of each pair of the differential signals for conversion, and then loads the differential signals to the pair 4-5 of twisted pairs of the category 5 cables for transmitting; the uplink mobile communication signals from the user terminal are sent into the near-end host unit in the form of differential signals through the pair 7-8 of twisted pairs; in the near-end host unit, N uplink differential-to-single ended units convert the uplink mobile communication signals into the singled ended signals respectively to provide to the uplink signal allocation unit; the uplink signal allocation unit combines the N paths of signals into the intermediate-frequency uplink mobile communication signals; and finally the host frequency conversion unit converts the uplink mobile communication signals from the intermediate-frequency signals back to the radio-frequency signals to transmit to the base station;

meanwhile, after the downlink Ethernet signals from the optical network unit are sent into the host unit, they are loaded to the pair 1-2 of twisted pairs of the category 5 cables or the category 5 enhanced cables via the corresponding network transformer units; the uplink Ethernet signals from the client side are transmitted from the pair 3-6 of twisted pairs of the category 5 cables or the category 5 enhanced cables to the optical network unit via the corresponding network transformer units;

the remote-end user unit comprises a terminal frequency conversion unit, a user side central control unit, N single ended-to-differential units, N differential-to-single ended units, an Ethernet data processing unit, and N network transformer units;

the Ethernet signals and the mobile communication signals transmitted from the near-end host unit enter the remote-end user terminal via EM1 port; two pairs 1-2 and 3-6 of twisted pairs are connected with the corresponding network transformers; each network transformer is connected with the Ethernet data processing unit, and the Ethernet data processing unit provides the broadband access service; the central control unit extracts the control signals from the pair 4-5 of twisted pairs, and resolves the control information transmitted from the near-end host unit so as to control the terminal frequency conversion unit and the Ethernet data processing unit, and upload the working statuses thereof to the central control unit of the host unit at regular time; the differential-to-single ended unit finishes the differential-to-single ended conversion, and separates the downlink mobile communication signals and the clock reference signals from the pair 4-5 of twisted pairs via high and low pass filter, and sends to the remote-end frequency conversion unit for performing downlink transmission;

meanwhile, the uplink mobile communication signals are converted to the intermediate-frequency signals via the remote-end frequency conversion unit, and loaded to the pair 7-8 of twisted pairs through the impedance change of the single ended-to-differential units and the single ended-to-differential conversion in order to transmit to the near-end host unit.

Wherein, to realize remote-end power supply, the technical solution of the invention further comprises following configurations: the near-end host unit further comprises a host side power supply unit for outputting the direct current of +48 v, which is fed into the two pairs 1-2, 3-6 of twisted pairs through the secondary coil of each network transformer unit, wherein the pair 1-2 of twisted pairs are connected with the positive direct current of +48 v, and the pair 3-6 of twisted pairs are connected with the negative direct current;

the remote-end user unit comprises a power over Ethernet (POE) power supply unit, which extracts direct current power from the two pairs 1-2, 3-6 of twisted pairs, and provides power supply for each unit of the remote-end user terminal after the direct current conversion from +48 v to +5V.

Wherein, the control signal is the control signal meeting the RS485 protocol.

Corresponding to the system, the invention further provides an access method for transmitting Ethernet signals and mobile communication signals, comprising:

providing a near-end host unit and remote-end user units;

the near-end host unit is connected with an optical network unit for receiving and uploading the Ethernet signals; the near-end host unit is further connected with a base station for receiving and uploading the mobile communication signals; the near-end host unit is connected with the remote-end user units through category 5 cables or category 5 enhanced cables for transmitting the Ethernet signals and the mobile communication signals;

wherein, the near-end host unit comprises a host frequency conversion unit, a host central control unit, a downlink signal allocation unit, an uplink signal allocation unit, N uplink differential-to-single ended units, N downlink single ended-to-differential units, and N network transformer units;

after the downlink mobile communication signals from the base station enter the near-end host unit, the host frequency conversion unit performs down frequency conversion on the downlink mobile communication signals and sends into to the downlink signal allocation unit; meanwhile the host frequency conversion unit outputs the internal clock reference signals thereof to the downlink signal allocation unit; the downlink signal allocation unit combines the downlink mobile communication signals and the clock reference signals via a combiner, and further allocates the signals to allocate the downlink into N paths of signals; the N downlink single ended-to-differential units perform the conversion from the singled ended signal to the differential signal on the N paths of signals, so as to match with the impedance of the category 5 cables or category 5 enhanced cables; after the signals are converted to the differential signals, the central control unit sends a pair of control signals respectively into uplink and downlink of each pair of the differential signals for conversion, and then loads the differential signals to the pair 4-5 of twisted pairs of the category 5 cables for transmitting;

the uplink mobile communication signals from the user terminal are sent into the near-end host unit in the form of differential signals through the pair 7-8 of twisted pairs; in the near-end host unit, N uplink differential-to-single ended units convert the uplink mobile communication signals into the singled ended signals respectively to provide to the uplink signal allocation unit; the uplink signal allocation unit combines the N paths of signals into the intermediate-frequency uplink mobile communication signals; and finally the host frequency conversion unit converts the uplink mobile communication signals from the intermediate-frequency signals back to the radio-frequency signals to transmit to the base station;

meanwhile, after the downlink Ethernet signals from the optical network unit are sent into the host unit, they are loaded to the pair 1-2 of twisted pairs of the category 5 cables or the category 5 enhanced cables via the corresponding network transformer units; the uplink Ethernet signals from the client side are transmitted from the pair 3-6 of twisted pairs of the category 5 cables or the category 5 enhanced cables to the optical network unit via the corresponding network transformer units;

the remote-end user unit comprises a terminal frequency conversion unit, a user side central control unit, N single ended-to-differential units, N differential-to-single ended units, an Ethernet data processing unit, and N network transformer units;

the Ethernet signals and the mobile communication signals transmitted from the near-end host unit enter the remote-end user terminal via EM1 port; two pairs 1-2 and 3-6 of twisted pairs are connected with the corresponding network transformers; each network transformer is connected with the Ethernet data processing unit, and the Ethernet data processing unit provides the broadband access service; the central control unit extracts the control signals from the pair 4-5 of twisted pairs, and resolves the control information transmitted from the near-end host unit so as to control the terminal frequency conversion unit and the Ethernet data processing unit, and upload the working statuses thereof to the central control unit of the host unit at regular time; the differential-to-single ended unit performs the differential-to-single ended conversion, and separates the downlink mobile communication signals and the clock reference signals from the pair 4-5 of twisted pairs via high and low pass filter, and sends to the remote-end frequency conversion unit for performing downlink transmission;

meanwhile, the uplink mobile communication signals are converted to the intermediate-frequency signals via the remote-end frequency conversion unit, and loaded to the pair 7-8 of twisted pairs through the impedance change of the single ended-to-differential units and the single ended-to-differential conversion in order to transmit to the near-end host unit.

Through the invention, the cables are not needed to be re-deployed, and the premise network resources and user resources are directly used to solve the indoor signal coverage problem; meanwhile, considering the problem that the power is not easy to take at the user's home, the indoor deep coverage problem of the mobile communication signals of the telecom operators is solved in the remote feeding manner; the problems of the telecom operators that the mobile communication signals are difficult to lead to home and the property management is difficult are solved.

DETAILED DESCRIPTION OF THE INVENTION

The embodiments of the invention are described below with reference to the accompanying drawings in detail.

Figure 1:
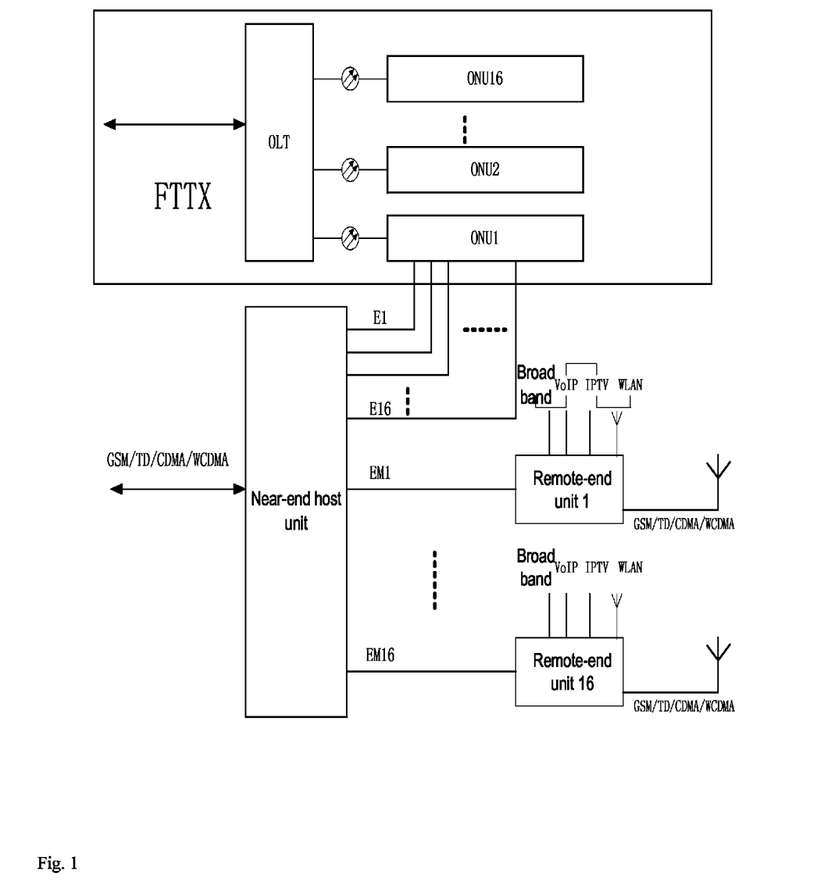
FIG. 1 shows a system block diagram of an access system of the invention.

FIG. 1 shows a system block diagram of a comprehensive access system of the invention. The Ethernet signals from the ONU access the near-end host unit via a category 5 cable; the mobile communication signals of one or two of the standards of GSM, CDMA, WCDMA, TD-SCDMA, wireless local area network (WLAN) and the like from the base station enter the host unit via the radio-frequency cable, and the combination of the Ethernet signals and the mobile communication signals is completed in the interior of the host unit. The signals are sent to the user's home via the category 5 cable after being combined, and the services, such as broadband Internet access, Internet protocol television (IPTV), voice over Internet phone (VoIP), WLAN, wireless access and the like are provided for the user by the user terminal at the user's home. One host unit can be connected with 16 user terminal units, and even connected with more than 24 user terminal units through expansion.

Figure 2:
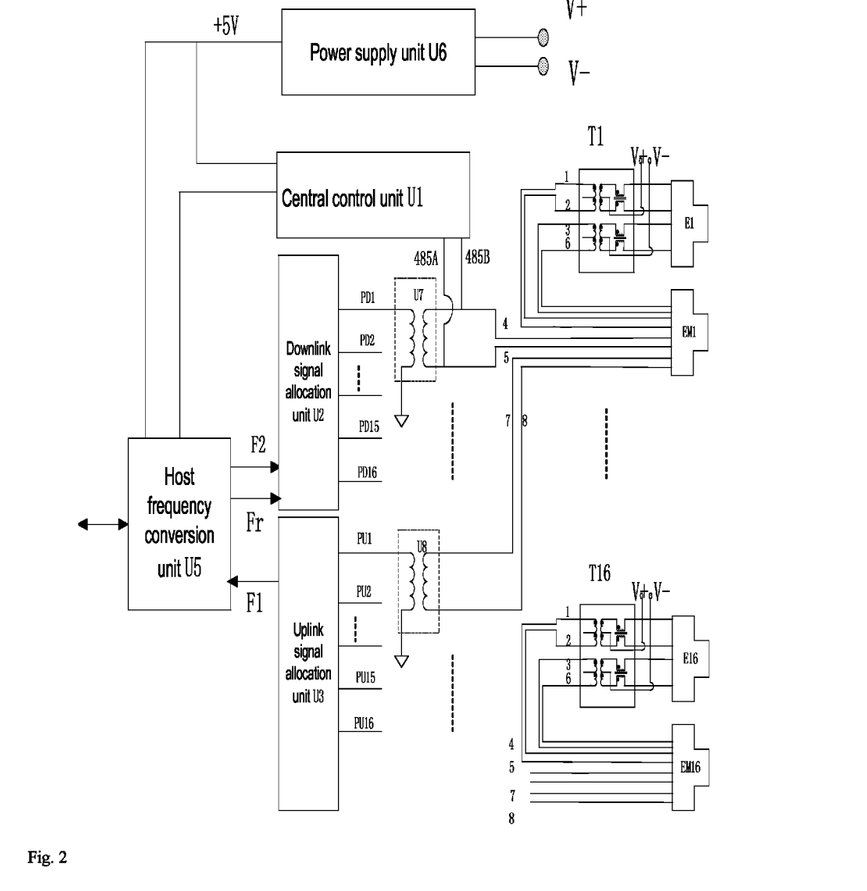
FIG. 2 shows a system block diagram of a near-end host unit of the invention.

The signal coupled from the base station is sent into the near-end frequency conversion unit of FIG. 2 (functional block diagram of the host unit) for shifting frequency. The mobile communication signal is relocated to the lower frequency so as to reduce the transmission loss; the downlink signal becomes F1, and the uplink signal becomes F2, and in order to ensure the impedance matching property and reduce the common mode interference, the frequency-shift signals F1 and F2 on the uplink and the downlink are subject to single ended-to-differential conversion; the downlink signals are transmitted via pair 4-5 of twisted pairs, and the uplink signals are transmitted via pair 7-8 of twisted pairs (to ensure the synchronization of the near end and remote end, the reference clock signal Fr at the near end is also transmitted via pair 4-5 of twisted pairs, and is then extracted at the remote end as the reference for the remote-end phase locked loop), and finally the transmission of the Ethernet signals and the mobile communication signals is finished with two pairs 1-2, 3-6 of twisted pairs via a category 5 cable; after the signals are transmitted to the user's home, the two signals are processed separately through the user terminal, and the Ethernet signal processing circuit provides the services such as broadband access, VoIP, IPTB, WLAN and the like, and the mobile communication signal processing circuit provides the mobile phone access service.

FIG. 2 shows a system block diagram of the near-end host unit. The near-end host unit comprises a host frequency conversion unit U5, a power supply unit U6, a central control unit U1, a downlink signal allocation unit U2, an uplink signal allocation unit U3, single ended-to-differential units U7 and U8, and a plurality of network transformer units T1-T16. After the mobile communication signals enter the host, the host frequency conversion unit U5 performs down frequency conversion on the downlink signals to convert the frequency of the mobile communication signals to F1 and send into U2, and meanwhile the host frequency conversion unit U5 outputs the internal clock reference frequency Fr thereof to send into U2; the combination of F1 and Fr is completed within the U2 via the combiner, and then the signals are equally divided to divide the downlink into 16 paths of signals equally; then the 16 paths of signals are subject to the conversion of the single ended-to-differential unit, wherein the first path is converted through the U7 unit (each of the other paths should be subject to the single ended-to-differential conversion, and no detailed description is made here) so as to match with the impedance of the category 5 cable, and the single ended signal impedance of 50 ohm is converted into the differential impedance of 100 ohm, so that anti-common mode interference capacity of the line is increased. After the signals are converted into the differential signals, the central control unit U1 sends a pair of control signals 485A, 485B of RS485 to this pair of differential signals respectively, and sends the RS485 monitoring signal to the user terminal via this pair of twisted pairs so as to perform control on the user terminal and the collection work on the related information through the near end.

After the downlink is converted, the differential signals are transmitted via pair 4-5 of twisted pairs. Similarly, the uplink mobile communication signals F2 from the user terminal are sent into the near-end host unit via pair 7-8 of twisted pairs. In the near-end host unit, the signals are subject to the differential-to-single ended conversion through the U8 firstly, and then enter the power allocation unit of the uplink through the U3, and finally enter the frequency conversion unit U5 through the F2; and the U5 converts the signals from the intermediate-frequency signals F2 back to the radio-frequency signals to send back to the base station, thus the uplink communication is completed.

After the Ethernet signals E1-E16 (two pairs 1-2, 3-6 of twisted pairs) from the ONU are sent into the host unit, the signals are applied to the two pairs 1-2, 3-6 of twisted pairs of the category 5 cable through the network transformers T1-T16 respectively, and then transmitted to the remote end via a category 5 cable with the two pairs 4-5, 7-8 of twisted pairs bearing the mobile communication signals.

In order to facilitate faster deployment without being subject to the fact whether the power supply at the user's home is convenient or not, a remote feeding manner is adopted in the implementation of the solution to supply power for the remote-end unit, so it can operate without taking power from the user's home. The power supply unit U6 outputs direct current of +48V, which is fed into the two pairs 1-2, 3-6 of twisted pairs through the secondary coils of the network transformer units T1-T16; pair 1-2 of twisted pairs are connected with the positive direct current of +48 v, and the pair 3-6 of twisted pairs are connected with the negative direct current.

Figure 3:
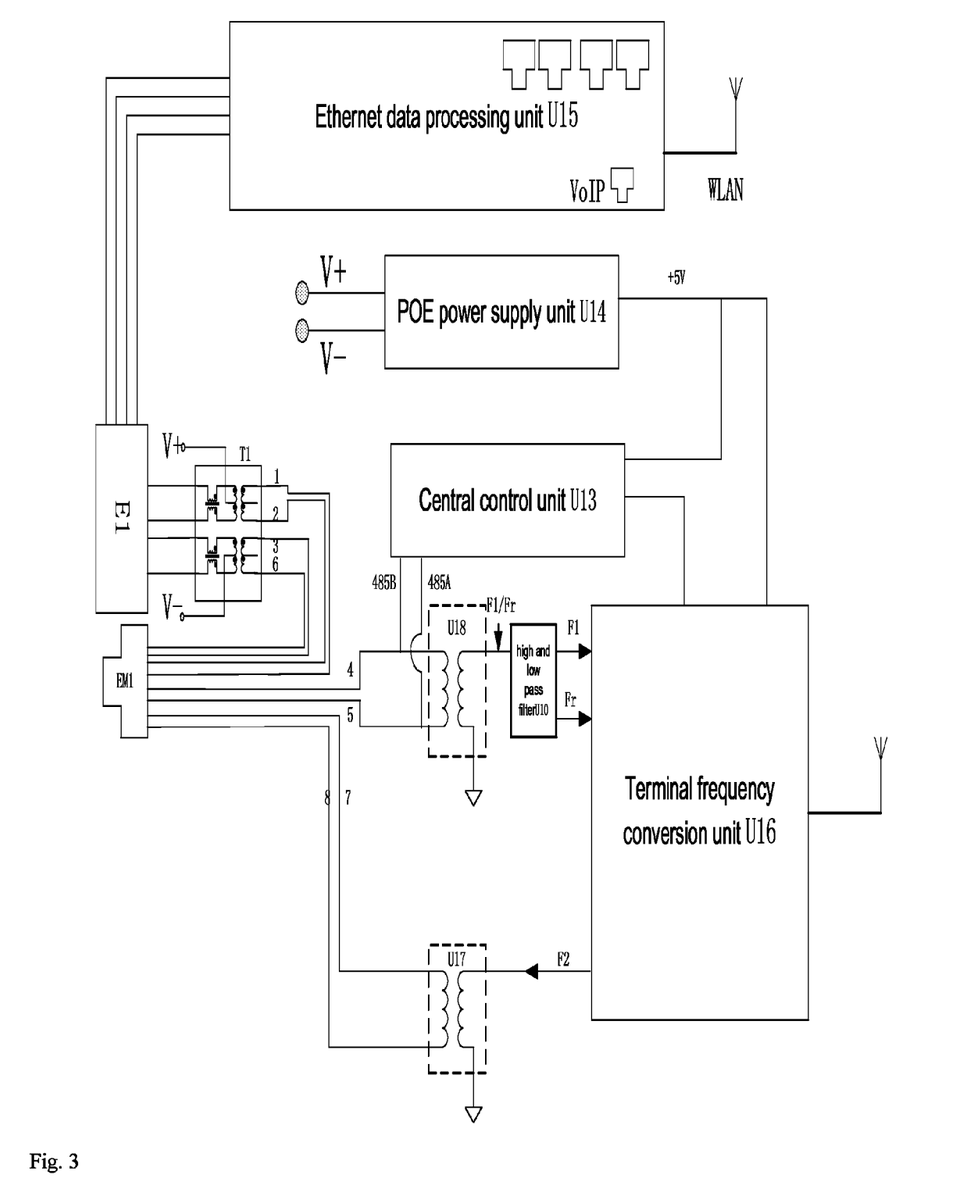
FIG. 3 shows a system block diagram of a remote-end user unit of the invention.

FIG. 3 shows a system block diagram of the remote-end user unit. The remote-end user unit comprises the components such as a terminal frequency conversion unit U16, a POE power supply unit U14, a central control unit U13, single ended-to-differential units U17-U18, an Ethernet data processing unit U15, network transformer units T1'-T16' and the like. The Ethernet signals and the mobile communication signals transmitted from the near-end host unit enter the remote-end user terminal via EM1 port; the Ethernet signals transmitted on the two pairs 1-2, 3-6 of twisted pairs enter the Ethernet data processing unit U15 for processing via the network transformer unit T1', and the U15 provides the broadband access service. A mature chip solution in the industry is adopted for the unit implementation solution of U15. The POE power supply unit U14 extracts direct current power from the two pairs 1-2, 3-6 of twisted pairs, and provides power supply for each unit of the remote-end user terminal after the direct current conversion from +48 v to +5V.

The central control unit U13 extracts the RS485 communication signals from the pair 4-5 of twisted pairs, and resolves the control information transmitted from the host unit so as to control the terminal frequency conversion unit U16 and the Ethernet data processing unit U15, and upload the working statuses thereof to the central control unit of the host unit at regular time. The U17-U18 finish the differential-to-single ended conversion; the downlink intermediate-frequency signals F1 and clock reference frequency signals Fr are transmitted on the pair 4-5 of twisted pairs; F1 and Fr are separated through the high and low pass filter U10, and then sent into the terminal frequency conversion unit U16. The signals from the uplink are converted into the intermediate-frequency signals F2 via the remote-end frequency conversion unit U16, and transmitted to the host unit via pair 7-8 of twisted pairs through the impedance conversion of U18 and single ended-to-differential conversion.

In the above embodiment, in order to monitor the remote end at the near end, the RS485 communication protocol is adopted to transmit the RS485 communication signals via pair 4-5 of twisted pairs; and after arriving at the remote end, the RS485 signals are extracted out to control the working statuses of the remote-end unit, including gain adjustment, time slot dynamic adjustment, signal shutoff and the like. If various alarms occur at the remote end, the alarm and fault information can be sent to the near end in the RS485 communication manner.

Meanwhile, if the POE solution is adopted to supply power, the power will not be needed to be taken at the user's home, so the safety and reliability are very high. V+ is powered via pair 1-2 of twisted pairs, and V− is powered via pair 3-6 of twisted pairs, and meanwhile the 100 Mbps Ethernet signals are transmitted through two pairs 1-2, 3-6 of twisted pairs.

The near-end host can communicate with the mobile gateway center in the short message manner, and also can communicate through the Ethernet by taking the near-end host equipment as a remote end of the ONU equipment.

Figure 4:
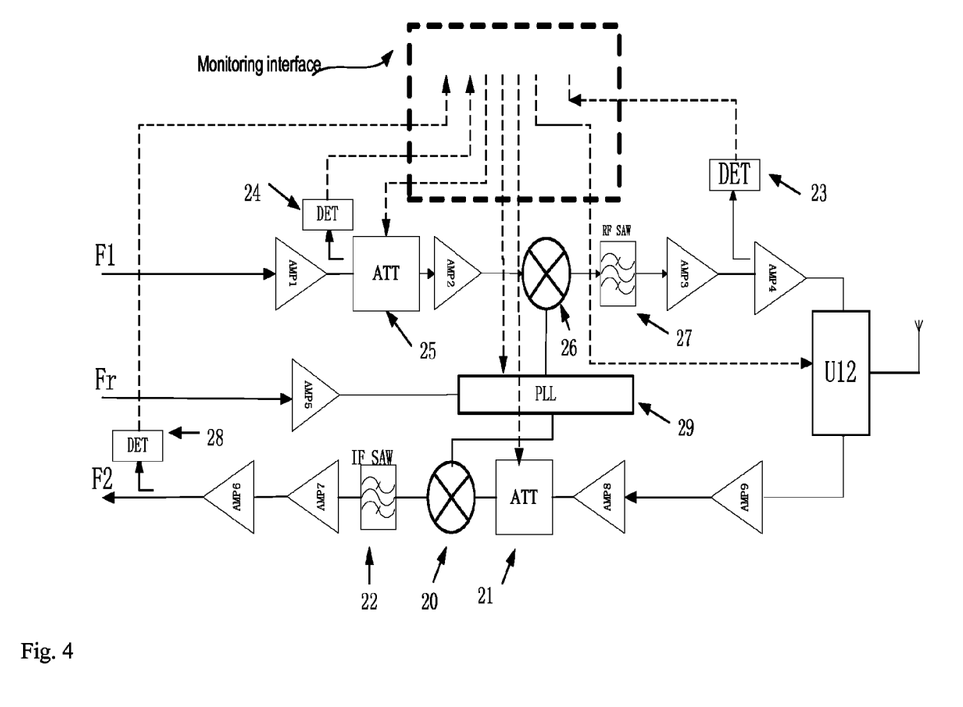
FIG. 4 shows a system block diagram of a terminal frequency conversion unit of the invention.

FIG. 4 shows a structure of the terminal frequency conversion unit. The terminal frequency conversion unit U16 comprises the downlink and the uplink. After being amplified by the amplifier 1, the intermediate-frequency signal F1 of the downlink is processed by the numerical control attenuator ATT25, and then amplified by the amplifier 2; after the level is appropriately adjusted, the intermediate-frequency signal F1 is changed back to the radio-frequency signal through the mixer 26; the radio-frequency signal is filtered by the surface acoustic wave filter 27 to remove the spurious waves, and then amplified by the amplifiers 3 and 4; the level of the downlink is adjusted to the appropriate level, and the signal is processed by the uplink and downlink switching unit U12 (U12 unit, which is a duplexer for the frequency division duplex wireless system, and which is a radio-frequency switch for the time division duplex wireless system, which is controlled by the central control unit U13 for switching on/off of the uplink and downlink), and is finally transmitted through the antenna.

The signal of the downlink is coupled through a coupler behind the amplifier 1, and then sent into the detector DET24 for completing downlink input power detection; for the frequency division duplex system, the automatic level gain control of the downlink can be completed together with the detector 23; and for the time division duplex system, the detector signal of the DET24 can be sent into the central control unit; the central control unit finishes extracting the time division synchronization signal, and outputs the time division synchronization control signal to control the radio-frequency switch U12 to perform uplink and downlink switching.

The signal of the uplink enters the amplifier 9 and amplifier 8 via the switch or the duplexer U12; after the signal is amplified to the appropriate level, it enters the numerical control attenuator 21, through which the gain magnitude of the uplink can be controlled, and then enters the mixer 20 for frequency conversion to convert the frequency into F2; then the F2 signal is amplified to a certain level in order to withstand the attenuation of the line transmission. After the uplink intermediate-frequency signal F2 is subject to the single ended-to-differential conversion of U17, the signal is transmitted through pair 7-8 of twisted pairs. The DET 28 finishes detection of the uplink output level. The PLL 29 is used for generating local oscillator signals and providing local oscillator signals for mixers 20 and 26. The reference signal of the PLL is from the clock reference signal Fr transmitted from the host unit, which is amplified by the amplifier 5 in the terminal frequency conversion unit and then enters the PLL 29 for providing phase locked reference.

After the F2 signal is sent into the near-end host through the pair 7-8 of twisted pairs, it enters U8 to finish the differential-to-single ended conversion of the uplink; and then enters the uplink signal allocation unit U3 to electrically combine the uplink signal of each remote end, and is then changed back to the radio-frequency signal through the host frequency conversion unit U6.

Figure 5:
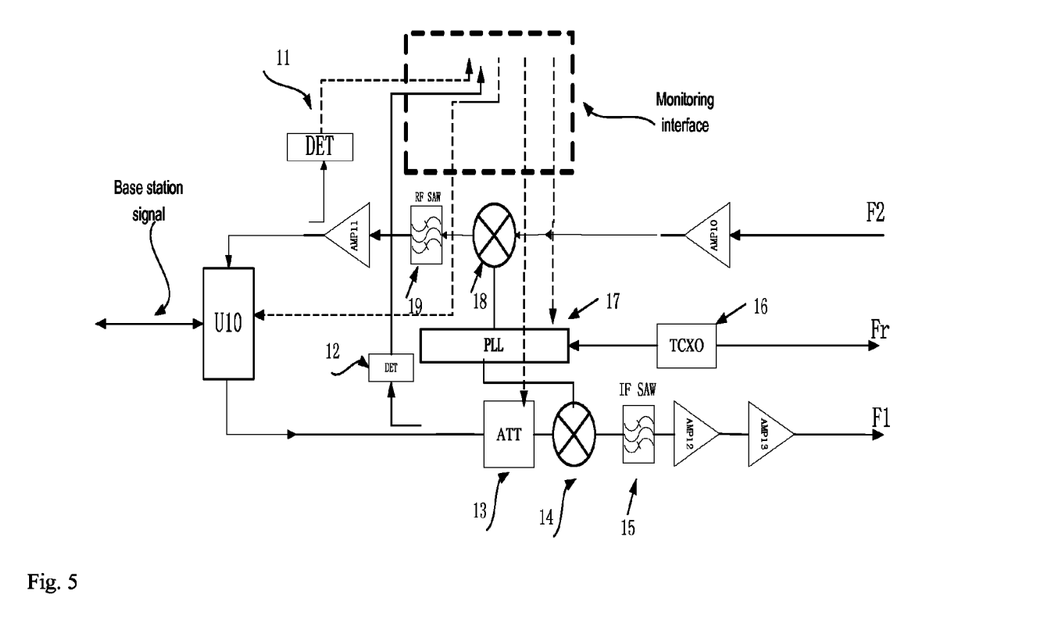
FIG. 5 shows a system block diagram of a host frequency conversion unit of the invention.

FIG. 5 shows a structure of the host frequency conversion unit. The F2 signal is amplified by the amplifier 10 to the appropriate level; and the intermediate-frequency F2 signal is changed back to the radio-frequency signal through the mixer 14; the radio-frequency signal is filtered by the filter 19 to remove the spurious signals, and then amplified by the amplifiers 11 to complete the output level adjustment of the signal; then enters the base station through the U10 (U10 unit, which is a duplexer for the frequency division duplex wireless system, and which is a radio-frequency switch for the time division duplex wireless system, is controlled by the central control unit U1 for switching on/off of the uplink and downlink) to complete the communication process of the uplink.

Through the inventive patent, the premise network resources can be utilized to a maximum extent without re-laying the category 5 cables; it only needs to add one near-end host unit beside the optical network unit (ONU) equipement, and replace the user terminal simultaneously. The power is not needed to be taken at the user's home, and the placement position of the terminal is flexible without being limited by the power-taking positions, so it is very convenient to provide the Ethernet signals and mobile communication signals. One near-end host unit can be provided with 16 remote ends, and the farthest communication distance of each user is up to 100 m.

Through the application of the technology of the invention, the network building cost can be saved to a maximum extent for the operator; the investment is less and it is quick and convenient to provide service. In addition, the solution of the invention is flexible to apply, and can be flexibly configured according to the user's requirement, so either the Ethernet signal or the mobile communication signal can be provided only.

The above is only the preferred embodiment of the invention and not intended to limit the invention, and any modifications, equivalent replacements, improvements and the like within the spirit and principle of the invention shall fall within the scope of protection of the invention.

The invention claimed is:

1. An access system for transmitting Ethernet signals and mobile communication signals, the access system comprising:
a near-end host unit and N remote-end user units, wherein the near-end host unit is connected with an optical network unit for receiving and uploading the Ethernet signals, the near-end host unit being further connected with a base station for receiving and uploading the mobile communication signals, the near-end host unit is connected with the remote-end user units through category 5 cables or category 5 enhanced cables for transmitting the Ethernet signals and the mobile communication signals,
wherein, the near-end host unit comprises:
a host frequency conversion unit;
a host central control unit;
a downlink signal allocation unit;
an uplink signal allocation unit;
N uplink differential-to-single ended units;
N downlink single ended-to-differential units; and
N network transformer units,
wherein after the downlink mobile communication signals from the base station enter the near-end host unit, the host frequency conversion unit performs down frequency conversion on the downlink mobile communication signals and sends to the downlink signal allocation unit; the host frequency conversion unit simultaneously outputs the internal clock reference signals thereof to the downlink signal allocation unit; the downlink signal allocation unit combines the frequency-converted downlink mobile communication signals and the clock reference signals via a combiner, and further allocates the signals to allocate the downlink into N paths of signals; the N downlink single ended-to-differential units perform the conversion from the singled ended signal to the differential signal on the N paths of signals, so as to match with the impedance of the category 5 cables or category 5 enhanced cables; after the signals are converted to the differential signals, the central control unit sends a pair of control signals respectively into uplink and downlink of each pair of the differential signals for conversion, and then loads the differential signals to the pair 4-5 of twisted pairs of the category 5 cables for transmitting; the uplink mobile communication signals from the user terminal are sent into the near-end host unit in the form of differential signals through the pair 7-8 of twisted pairs; in the near-end host unit, N uplink differential-to-single ended units convert the uplink mobile communication signals into the singled ended signals respectively to provide to the uplink signal allocation unit; the uplink signal allocation unit combines the N paths of signals into the intermediate-frequency uplink mobile communication signals, and finally the host frequency conversion unit converts the uplink mobile communication signals from the intermediate-frequency signals back to the radio-frequency signals to transmit to the base station;
after the downlink Ethernet signals from the optical network unit are sent into the host unit, they are loaded to the pair 1-2 of twisted pairs of the category 5 cables or the category 5 enhanced cables via the corresponding network transformer units; the uplink Ethernet signals from the client side are transmitted from the pair 3-6 of twisted pairs of the category 5 cables or the category 5 enhanced cables to the optical network unit via the corresponding network transformer units;

the remote-end user unit comprises a terminal frequency conversion unit, a user side central control unit, N single ended-to-differential units, N differential-to-single ended units, an Ethernet data processing unit, and N network transformer units;

the Ethernet signals and the mobile communication signals transmitted from the near-end host unit enter the remote-end user terminal via EMI port; two pairs 1-2 and 3-6 of twisted pairs are connected with the corresponding network transformers; each network transformer is connected with the Ethernet data processing unit which provides the broadband access service; the central control unit extracts the control signals from the pair 4-5 of twisted pairs, and resolves the control information transmitted from the near-end host unit so as to control the terminal frequency conversion unit and the Ethernet data processing unit, and upload the working statuses thereof to the central control unit of the host unit at regular time; the differential-to-single ended unit finishes the differential-to-single ended conversion, and separates the downlink mobile communication signals and the clock reference signals from the pair 4-5 of twisted pairs via high and low pass filter, and then sends the separated downlink mobile communication signals to the remote-end frequency conversion unit for performing downlink transmission, and sends the separated clock reference signals to the remote-end frequency conversion unit for providing reference for the phase locked loop circuit;

the uplink mobile communication signals are converted to the intermediate-frequency signals via the remote-end frequency conversion unit, and loaded to the pair 7-8 of twisted pairs through the impedance change of the single ended-to-differential units and the single ended-to-differential conversion in order to transmit to the near-end host unit, wherein the near-end host unit further comprises a host side power supply unit for outputting the direct current of +48 v, which is fed into the two pairs 1-2, 3-6 of twisted pairs through the secondary coil of each network transformer unit, wherein the pair 1-2 of twisted pairs are connected with the positive direct current of +48 v, and the pair 3-6 of twisted pairs are connected with the negative direct current, such that the two pairs 1-2, 3-6 of twisted pairs are used for power supply and transmitting Ethernet signals;

the remote-end user unit comprises a power over Ethernet (POE) power supply unit, which extracts direct current power from the two pairs 1-2, 3-6 of twisted pairs, and provides power supply for each unit of the remote-end user terminal after the direct current conversion from +48 v to +5V.

2. The system according to claim 1, wherein the control signal is the control signal meeting the RS485 protocol.

3. An access method for transmitting Ethernet signals and mobile communication signals, comprising:

providing a near-end host unit and N remote-end user units, wherein the near-end host unit is connected with an optical network unit for receiving and uploading the Ethernet signals, the near-end host unit being further connected with a base station for receiving and uploading the mobile communication signals, the near-end host unit also being connected with the remote-end user units through category 5 cables or category 5 enhanced cables for transmitting the Ethernet signals and the mobile communication signals;

wherein, the near-end host unit comprises:
a host frequency conversion unit;
a host central control unit;
a downlink signal allocation unit;
an uplink signal allocation unit;
N uplink differential-to-single ended units;
N downlink single ended-to-differential units; and
N network transformer units, wherein after the downlink mobile communication signals from the base station enter the near-end host unit, the host frequency conversion unit performs down frequency conversion on the downlink mobile communication signals and sends into to the downlink signal allocation unit; the host frequency conversion unit simultaneously outputs the internal clock reference signals thereof to the downlink signal allocation unit; the downlink signal allocation unit combines the downlink mobile communication signals and the clock reference signals via a combiner, and further allocates the signals to allocate the downlink into N paths of signals; the N downlink single ended-to-differential units perform the conversion from the singled ended signal to the differential signal on the N paths of signals, so as to match with the impedance of the category 5 cables or category 5 enhanced cables; after the signals are converted to the differential signals, the central control unit sends a pair of control signals respectively into uplink and downlink of each pair of the differential signals for conversion, and then loads the differential signals to the pair 4-5 of twisted pairs of the category 5 cables for transmitting; the uplink mobile communication signals from the user terminal are sent into the near-end host unit in the form of differential signals through the pair 7-8 of twisted pairs; in the near-end host unit, N uplink differential-to-single ended units convert the uplink mobile communication signals into the singled ended signals respectively to provide to the uplink signal allocation unit; the uplink signal allocation unit combines the N paths of signals into the intermediate-frequency uplink mobile communication signals; and finally the host frequency conversion unit converts the uplink mobile communication signals from the intermediate-frequency signals back to the radio-frequency signals to transmit to the base station;

after the downlink Ethernet signals from the optical network unit are sent into the host unit, they are loaded to the pair 1-2 of twisted pairs of the category 5 cables or the category 5 enhanced cables via the corresponding network transformer units; the uplink Ethernet signals from the client side are transmitted from the pair 3-6 of twisted pairs of the category 5 cables or the category 5 enhanced cables to the optical network unit via the corresponding network transformer units;

the remote-end user unit comprises a terminal frequency conversion unit, a user side central control unit, N single ended-to-differential units, N differential-to-single ended units, an Ethernet data processing unit, and N network transformer units;

the Ethernet signals and the mobile communication signals transmitted from the near-end host unit enter the remote-end user terminal via EMI port; two pairs 1-2 and 3-6 of twisted pairs are connected with the corresponding network transformers; each network transformer is connected with the Ethernet data processing unit which provides the broadband access service; the central control unit extracts the control signals from the pair 4-5 of twisted pairs, and resolves the control information transmitted from the near-end host unit so as to control the terminal frequency conversion unit and the Ethernet data processing unit, and upload the working statuses thereof to the central control unit of the host unit at regular time; the differential-to-single ended unit finishes the differential-to-single ended conversion, and separates the downlink mobile communication signals and the clock reference signals from the pair 4-5 of twisted pairs via high and low pass filter, and then sends the separated downlink mobile communication signals to the remote-end frequency conversion unit for performing downlink transmission, and sends the separated clock reference signals to the remote-end frequency conversion unit for providing reference for the phase locked loop circuit;

the uplink mobile communication signals are converted to the intermediate-frequency signals via the remote-end frequency conversion unit, and loaded to the pair 7-8 of twisted pairs through the impedance change of the single ended-to-differential units and the single ended-to-differential conversion in order to transmit to the near-end host unit, wherein the near-end host unit further comprises a host side power supply unit for outputting the direct current of +48 v, which is fed into the two pairs 1-2, 3-6 of twisted pairs through the secondary coil of each network transformer unit, wherein the pair 1-2 of twisted pairs are connected with the positive direct current of +48 v, and the pair 3-6 of twisted pairs are connected with the negative direct current, such that the two pairs 1-2, 3-6 of twisted pairs are used for power supply and transmitting Ethernet signals;

the remote-end user unit comprises a power over Ethernet (POE) power supply unit, which extracts direct current power from the two pairs 1-2, 3-6 of twisted pairs, and provides power supply for each unit of the remote-end user terminal after the direct current conversion from +48 v to +5V.

4. The access method for transmitting Ethernet signals and mobile communication signals according to claim 3, wherein the control signal is the control signal meeting the RS485 protocol.

* * * * *